March 25, 1952     M. WALLACE     2,590,809
VARIABLE SELECTIVITY PANORAMIC SYSTEM
Filed Feb. 26, 1948
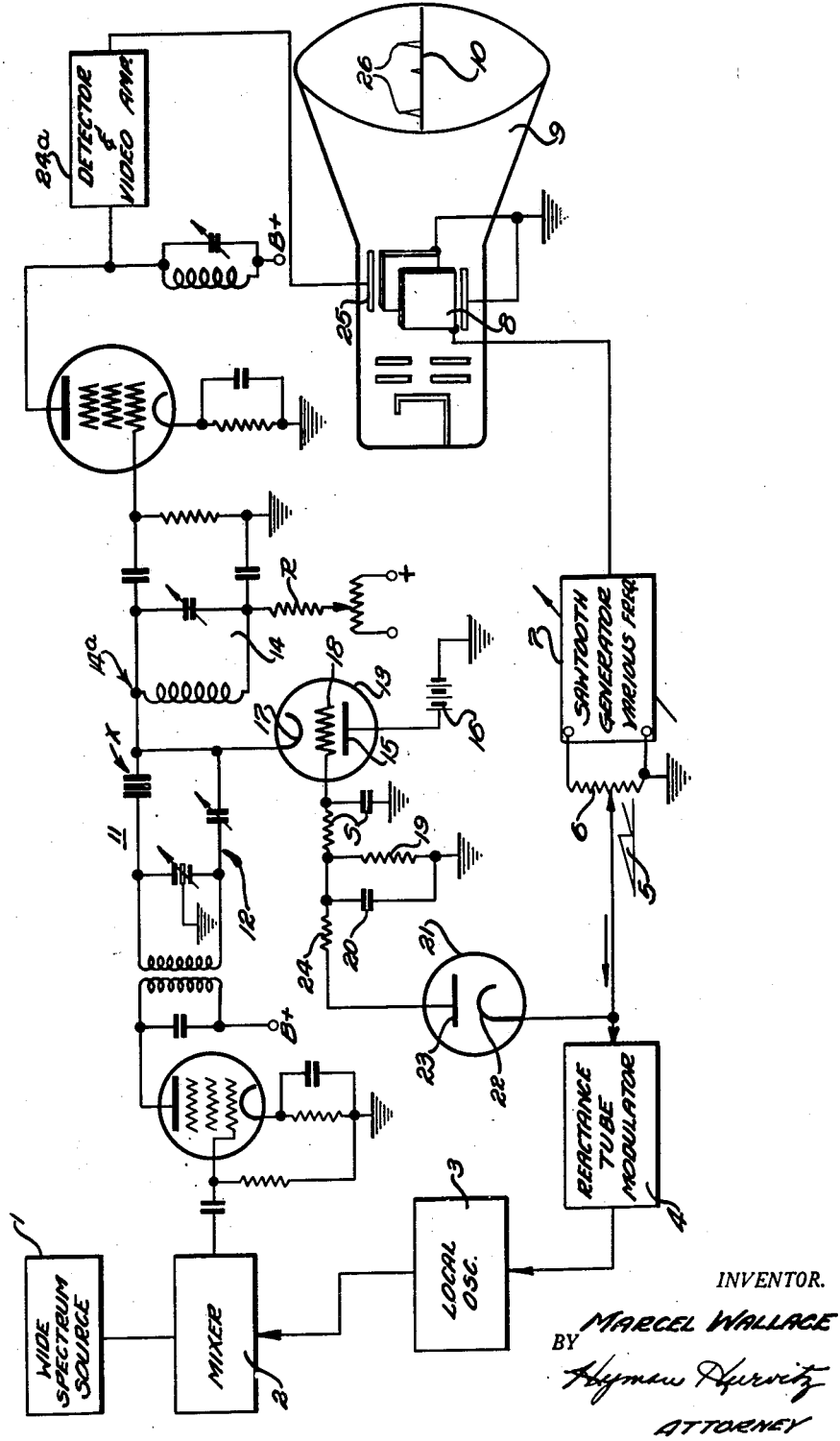
INVENTOR.
BY *MARCEL WALLACE*
*Hyman Hurvitz*
ATTORNEY Patented Mar. 25, 1952

2,590,809

UNITED STATES PATENT OFFICE 2,590,809

VARIABLE SELECTIVITY PANORAMIC SYSTEM

Marcel Wallace, East Portchester, Conn., assignor, by mesne assignments, of one-half to said Wallace, doing business as Panoramic Laboratories, East Portchester, Conn.

Application February 26, 1948, Serial No. 11,265

16 Claims. (Cl. 250—20)

This invention relates generally to spectrum analyzers of the panoramic type, and more particularly to panoramic spectrum analyzers having provision for automatically maintaining optimum resolution under variable operating conditions.

The general character of panoramic spectrum analyzers is well known to the art, involving generally an input circuit, for translating the spectrum of frequencies to be analyzed, a wide band mixer to the input of which the spectrum of frequencies is applied, a source of local oscillations for application to the mixer to effect heterodyning of the spectrum of frequencies, a narrow band intermediate frequency amplifier coupled to the output of the mixer, which accepts only a relatively small part of the total frequency spectrum to be analyzed, and means for frequency modulating the source of local oscillations to effect translation of successive portions of the frequency spectrum to be analyzed into the I. F. amplifier, in sequence. The action of the system is then effectively to sweep the wide band frequency spectrum to be analyzed past the narrow band I. F. amplifier, the latter abstracting from the frequency spectrum in succession small increments of signal distributed along the spectrum. The signals present in the I. F. amplifier may be detected and the resulting video signals amplified and applied to modulate or deflect the cathode ray beam of an oscilloscope, a sweep voltage proportional to the frequency of the local oscillator being simultaneously applied to the beam, to provide a frequency axis against which the signal responsive modulations or deflections may be observed.

Systems of the above character have been described in United States Patent #2,381,940, issued to M. Wallace, and patents referred to therein.

The present invention relates to improvements in systems of the above character, the need for which arises by virtue of the character of the transient response inherent in tuned amplifiers, and consequently to the nature of the response of the I. F. amplifier of the conventional type of panoramic spectrum analyzer to signals transiently inserted therein by the frequency modulation or scanning of the source of local oscillations.

It will be clear that any I. F. channel will have a static selectivity characteristic, corresponding to a rough approximation with a single circuit resonance curve, and that if the local oscillator of a panoramic spectrum analyzer be swept at a sufficiently slow rate, the visual response of the system to a single impressed frequency at the input of the mixer will correspond precisely with the shape of the static characteristic, regardless of the pass width of the I. F. channel. As the rate of sweep is increased, however, the response of the system departs from the response which might have been predicted on the basis of the static characteristic, since the I. F. channel does not respond to an impressed signal as rapidly as is necessary to enable the static selectivity characteristic to be followed, and further, since once a response has been established it does not decay as rapidly as the impressed signal which caused the response is removed from the I. F. channel by the sweeping action of the frequency modulated or scanning source of local oscillations. The response is thus decreased in amplitude and broadened in frequency.

Let us define "effective resolution" S of a panoramic spectrum analyzer as the frequency difference, in cycles, between points of the visual response curve of the system, at 30% down from the peak amplitude value, while the system is scanning.

Let us further define "static resolution" P of a panoramic spectrum analyzer to be the frequency separation, in cycle, between points of the visual response curve of the analyzer which are 30% down from the peak amplitude value, taken at zero sweep, or on a point by point basis.

It follows that for scanning rates approaching zero the values of P and S will be equal. As the sweep rate is increased, however, the value of S will increase, i. e. the response of the system to a single frequency signal will broaden and be greater than P. It has been found, both by analysis and experimentally, that the effective resolution S, under scanning conditions, is approximately equal to $$\sqrt{2\frac{dF}{dt}}$$

or the square root of twice the rate of frequency sweep, in cycles per second, and in fact that the optimum value of static resolution P for any given rate of frequency scan is provided by the relation $$P=\sqrt{\frac{dF}{dt}}$$

In cases where sweep rate is linear $$\frac{dF}{dt}=V=wf$$

where $V$ = velocity of sweep in cycles per second
$w$ = visual bandwidth in cycles presented visually by the system, or the width of the total band subject to analysis
$f$ = repetition rate of scanning of the bandwidth $w$, in repetitions per second.

The above relations determine a limitation on the value of P for any given value of V, or $$\frac{dF}{dt}$$

and vice versa. A value of P must be selected for any given application, which has at least a sufficiently great value to enable resolution or visual separation of signals, having frequency separations determined by the operational requirements of a given panoramic system, i. e. by the total bandwidth to be analyzed, and by the required rate of sweep repetition.

The value of P must be further limited in respect to maximum allowable value, since, first, the greater the value of P, the poorer the resolution of the system, and, second, because of the lower signal-to-noise ratios available as values of P are increased.

As a good design average it has been found that an optimum relationship between P, V, $w$ and $f$ is provided by the equation:

$$P = \sqrt{V} = \sqrt{wf}$$

Study of the above relations indicates that, in a panoramic system of spectrum analysis, wherein the total frequency sweep $w$ may be adjusted over a considerable range of values, i. e. as great as 100:1, tremendous increases in resolution may be attainable by effecting re-arrangement of the I. F. selectivity or pass band, for each value of total frequency sweep, in such manner as to maintain optimum effective selectivity, as determined by the relationships developed above.

For many purposes it is desirable, in panoramic analysis, to provide a frequency sweep or scanning repetition rate $f$ which is variable, so that adjustment of sweep repetition rate $f$ may be accomplished for any selected value of total sweep $w$. Again the possibility of maintaining the effective resolution at optimum values, as the repetition rate $f$ varies, is of great importance in panoramic systems if effective operation is to be maintained, especially since the effect on resolution of an increase of sweep repetition rate $f$ is cumulative to the effect of an increase of sweep width $w$, in terms of a multiplication of the factors $w$ and $f$.

It is the primary purpose of the present invention to provide a system of panoramic spectrum analysis wherein automatic adjustment of the resolution of the system is accomplished for all values and combinations of values of sweep repetition rate and total visual band presentation.

It is a broad object of the invention to provide a system of panoramic spectrum analysis wherein the dynamic resolution of the system is automatically maintained at optimum value for various conditions of manual adjustment of the system.

It is a further object of the invention to provide a system of panoramic spectrum analysis wherein adjustment of dynamic resolution of a panoramic spectrum analyzer are accomplished automatically in response to measurements of the factors involved in determining dynamic resolution.

The above and still further features and advantages of the present invention will become apparent upon consideration of the following detailed description of a specific embodiment of the invention, when taken in conjunction with the accompanying drawings, wherein the single figure represents a circuit diagram of a specific embodiment of the invention.

Briefly described, the invention involves a panoramic spectrum analyzer comprising a source of the spectrum which is to be analyzed, the source supplying the spectrum to a wide band mixer. To the mixer is further applied the output of a frequency modulated local oscillator, the modulation being accomplished in response to a sawtooth control or modulation voltage which is also applied to the horizontal deflection electrodes of a cathode ray tube indicator, to provide a frequency calibratable base line on the face of the indicator.

The output of the mixer is applied to a relatively narrow band I. F. amplifier, having provisions for variable selectivity in response to an electrical control voltage. The control voltage is developed by rectifying the sawtooth modulating voltage, a suitable R.-C. filter being connected in the rectifier circuit for providing a response which depends upon frequency of the input to the rectifier, as well as upon the amplitude thereof.

In accordance with the relationships developed hereinbefore, between resolution, I. F. band width, frequency sweep rate and total frequency sweep, it will be clear that in order to maintain a given resolution, found to be adequate or optimum at the minimum sweep rate and at the minimum total sweep, when either the sweep rate, or the sweep, or both, are increased, the value of P, i. e. the I. F. static selectivity, must be increased as the square root of the sweep rate and of the total sweep. It has been found that the response of the rectifier circuit may be made to a reasonable approximation, linear, with increasing $w$ or $f$, and that this linear response may be transformed to a square law response by translation in a triode operating on a suitable portion of its characteristic.

Turning now to the drawings, the reference numeral 1 denotes a source of signals, which may occupy a wide spectrum. For the sake of example only, the source 1 may comprise a radio frequency antenna and a radio frequency amplifier, the system of the invention being applied as a radio signal receiver. Alternatively, the source 1 may comprise a frequency converter, for converting signals either upward or downward in frequency, and to values suitable for further conversion in the wide band mixer 2.

To the input circuit of the mixer 2 may be applied the output of a local oscillator 3, with which is associated a reactance tube modulator 4 for varying the frequency of the local oscillator 3. To the reactance tube modulator 4 is applied modulating or control voltage 5 of sawtooth character, which derives over a manually controllable potentiometer 6 from a sawtooth voltage generator 7, which may itself be manually variable in respect to frequency of its output.

The output of the sawtooth voltage oscillator 7 is applied to the horizontal deflection electrodes 8 of a cathode ray tube indicator 9, providing a frequency axis 10 on the face of the indicator.

The output of the mixer 2 is applied to an I. F. amplifier 11, comprising a highly selective crystal filter 12. The I. F. amplifier 11 and the crystal filter 12 are of conventional character per se, and need not be therefore described in detail. Suffice it to state that the crystal X of the filter 12 is equivalent to a small resistance, at resonance, so that the output voltage of the filter is maximum. At frequencies slightly off resonance the crystal impedance becomes quite high and the output voltage becomes correspondingly small.

It is shown, in standard reference volumes, that the selectivity of the filter 12 depends upon its terminating impedance comprising in the present instance the parallel tuned circuit 14. The impedance of the output tuned circuit 14 may be varied by varying its Q or ratio of reactance to resistance. As the Q of the tuned output circuit 14 is reduced, the impedance thereof decreases and the selectivity of the filter becomes greater. The Q of the tuned output circuit 14 may be varied by adding resistance in series, or in parallel. If resistance is added in series the impedance of the tuned output circuit decreases with increase of resistance; and the selectivity of the filter 12 becomes accordingly greater. If, on the other hand, the resistance is added in parallel to the tuned output circuit 14, the result of decreasing the resistance is a reduction of the output impedance, and an increase in selectivity.

Loading the output of the filter is accomplished in the presently described embodiment of the invention, by connecting a triode 13 across the parallel tuned circuit 14 which terminates the filter 12. The plate 15 of the triode 13 may be supplied with positive potential from a suitable source 16, the cathode 17 of the triode 13 being connected to the ungrounded terminal 14a of the parallel circuit 14. The internal resistance of the triode 13 is thereby connected across the output tuned circuit 14, loading the latter, and thereby the entire filter 12.

The internal rsistance of the triode 13 is subject to variation in response to control potentials applied to the grid 18 thereof, the triode 13 having lower internal impedance as the potential of the grid 18 increases positively with respect to ground. The pass band of the crystal filter 12 is decreased as the Q of the tuned circuit 14 decreases in response to decreasing negative bias on the triode 13.

The normal bias of the triode 13, which may be defined as that produced in response to minimum sweep width W and sweep repetition rate f, may be adjusted to provide minimum resistance in triode 13, and maximum selectivity of the filter 12, as a whole, and is designed to provide optimum resolution for the system at the minimum values of sweep width w and sweep repetition frequency f which the potentiometer 6 and the frequency setting of the sawtooth voltage oscillator 7 are capable of providing.

Bias for the grid of triode 13 is provided by a by-passed cathode resistor R in series with a suitable constant potential bias. The grid 18 is directly connected in series with a diode 21, the cathode 22 of which is connected to the variable tap of potentiometer 6, and the plate 23 of which is connected to the grid 18 via a coupling resistor 24, of relatively high value.

A time constant circuit, consisting of resistance 19 and capacitance 20, in parallel, is connected between ground and the plate 23 of diode 21.

By designing the resistor-condenser combination 19, 20, to have a time constant small relative to the greatest available time separation between peaks of the sawtooth voltage 5 as applied both to the reactance tube modulator 4 and to the cathode 22 of the diode 21, i. e. that corresponding with lowest available sweep repetition rate, the average voltage available across the R.-C. circuit 19, 20 is maintained at a value considerably less than equal to the peak of the modulating signal, and the bias on the grid 18 of triode 13 is thus approximately proportional to total sweep w. The potential on the grid 18 never attains substantial equality with the peak of the modulating signal because of the action of the coupling resistor 24, and of the leak resistor 19. Between peaks of the sawtooth voltage 5 charge leaks off the condenser 20 over its parallel resistor 19, while at and adjacent to the peaks the charging voltage is reduced by the I.-R. drop in resistor 24, the charge on the condenser building up so slowly that before the condenser can accumulate a full charge the sawtooth voltage drops off, and a further cycle of sawtooth voltage build-up commences.

At higher sweep frequencies, at any given amplitude of sawtooth voltage, the condenser charges more rapidly or more frequently, so that the accumulated voltage does not have time to leak off extensively before a further charge arrives. The average bias voltage provided by the R.-C. circuit 19 is accordingly increased in proportion to sweep repetition rate f, for a given amplitude of sawtooth voltage and this increase is at least approximately linear.

The actual voltage appearing at the plate 23 of the diode 21 is not constant, since the condenser 20 is subject to cyclic charge and discharge, and is accordingly not suitable for application directly to the grid 18 of the triode 13. A smoothing circuit S is accordingly interposed on the input circuit of the grid 18 of the triode 13, providing practically a steady control voltage thereto.

We have now shown that the bias on the grid 18 of triode 13 is a function, approximately, of w and f, the total frequency sweep and the sweep repetition rate, respectively, of the local oscillator 3.

The triode 13 is arranged to operate as nearly as possible as a square law device, i. e. with mutual conductance ($g_m$) squared proportional to grid voltage. This type of operation is, of course, typical of triodes at the lower portions of their plate current-grid voltage characteristics. Since $P^2=wf$, the conditions required for the maintenance of optimum resolution is attained by the specified operation of the triode 13.

In practice the triode 13 does not operate precisely in accordance with a square law. Likewise, the potential or bias on grid 18 of triode 13 does not vary in exactly linear fashion with either w or f. However, a practical inter-adjustment of the various responses of the triode 13 and of the bias generating circuit comprising diode 21 and R.-C. circuit 19, 20, together with resistance 24, results in a vast increase of resolution for the various possible ranges of values of the sweep repetition rate f and the total sweep w, optimum values of effective resolution S being substantially attainable over these ranges of values at least to the extent required in practical operation of the system.

The output of the I. F. amplifier 11 may be applied to a detector and video amplifier 24a, for detection of the signal provided by the I. F. amplifier 11 and subsequent amplification to a value adequate for application to the vertical deflection electrodes 25 of the cathode ray tube indicator 9. As each signal present in the source 1 is translated to the pass frequency of the I. F. amplifier 11, and is amplified thereby, accordingly, a visual response in the form of a pip 26 is created on the face of the indicator 9, and that pip occurs at a lateral position on the face of the indicator corresponding with the frequency of the original signal in the spectrum provided by the source 1, by reason of the synchronization of the horizontal sweep of the electrode beam of the cathode ray tube indicator 9, and the frequency modulation of the local oscillator 3.

While I have described and illustrated one specific application of the present invention, it will be clear that variations in the details of the circuit employed in exemplification of my invention, may be resorted to, as well as rearrangement of the circuits, without departing from the true spirit and scope of the invention, as defined in the appended claims.

What I claim and desire to secure by Letters Patent of the United States is:

1. A panoramic system comprising a source of signals occurring in a predetermined spectrum, a tunable signal translating circuit having a variable band width narrower than said predetermined spectrum, means for periodically sweeping the tuning of said tunable signal translating circuit across said predetermined spectrum at a predetermined rate, means for measuring said rate, and means responsive to said means for measuring for automatically modifying the band width of said translating circuit to provide optimum response of said translating circuit to said signals.

2. A panoramic system comprising a source of signals occurring at random in a predetermined spectrum, a tunable signal translating circuit having a variable band width narrower than said predetermined spectrum, means for periodically varying the tuning of said translating circuit to enable translation thereby of successive frequency increments within said predetermined spectrum, means for adjusting the rate of tuning variation of said translating circuit, means for measuring said rate, and means responsive to said means for measuring for automatically maintaining optimum response of said translating circuit for a plurality of different rates of tuning variation.

3. A panoramic system comprising a source of signals occurring at random in a predetermined spectrum, a tunable signal translating circuit having a variable band width narrower than said predetermined spectrum, means for repetitively varying the tuning of said translating circuit to enable translation thereby of successive increments of frequency within said predetermined spectrum, means for adjusting the repetition rate of variation of said tuning, means for measuring said rate, and means controlled in accordance with said repetition rate and in response to said means for measuring for automatically maintaining optimum response of said translating circuit over a range of repetition rates.

4. A panoramic system comprising a source of signals occurring at random in a predetermined spectrum, a tunable signal translating circuit having a variable band width narrower than said predetermined spectrum, means for repetitively varying the tuning of said translating circuit to enable translation thereby of successive increments of frequency within said predetermined spectrum, means for adjusting the total variation of said tuning during said repetitive variations, means for generating a control signal representative of said voltage variation, and means responsive to said control signal for automatically maintaining substantially optimum response of said translating circuit for a range of values of said total variation.

5. A panoramic system comprising a source of signals occurring within a predetermined spectrum, a mixer, a tunable local oscillator, means for applying said signals from said source and the output of said tunable local oscillator to said mixer for heterodyning, a relatively narrow band variable selectivity intermediate frequency amplifier coupled with said mixer for deriving heterodyned signals, means for modulating the frequency of said local oscillator comprising a source of control potential, the total frequency excursions of said local oscillator being a direct function of the maximum amplitude of said control potential, and means responsive to said control potentials for controlling the selectivity of said intermediate frequency amplifier in such sense as to improve the response of said intermediate frequency amplifier to said signals.

6. A panoramic system comprising a source of signals occurring within a predetermined spectrum, a mixer, a tunable local oscillator, means for applying said signals from said source and the output of said tunable local oscillator to said mixer for heterodyning, a relatively narrow band variable selectivity intermediate frequency amplifier coupled with said mixer for deriving heterodyned signals, means for modulating the frequency of said local oscillator comprising a source of control potential, the repetition rate of frequency excursions of said local oscillator being a direct function of the repetition rate of said control potential, and means responsive to the repetition rate of said control potentials for controlling the selectivity of said intermediate frequency amplifier in such sense as to improve the response of said intermediate frequency amplifier to said signals for a plurality of values of said repetition rate.

7. A panoramic system comprising a source of signals occurring at random in a predetermined spectrum, a tunable signal translating circuit having a variable band width narrower than said predetermined spectrum, means for repetitively varying the tuning of said translating circuit to enable translation thereby of successive increments of frequency within said predetermined spectrum, means for adjusting the total variation of said tuning during said repetitive variations, means for adjusting the repetition rate of said variations, means for developing control signal representative of said variation and repetition rate, and means responsive to said control signal for automatically maintaining substantially optimum response of said translating circuit to signals during said variation.

8. In a panoramic system, a source of signals, a local oscillator, means for modulating the frequency of said local oscillator, means for heterodyning signals deriving from said source of signals with the output of said local oscillator, an intermediate frequency amplifier coupled with the said mixer for amplifying the heterodyne product of said means for heterodyning, said amplifier having a predetermined static selectivity, means for controlling said means for modulating comprising a source of repetitive control potential, and means responsive to said repetitive control potential for varying said static selectivity substantially in proportion to $\sqrt{wf}$, where $w$ equals the total frequency excursion of said local oscillator and where $f$ equals the repetition rate of said control potential.

9. In a panoramic system, a source of signals occurring in a wide band spectrum, a mixer, a local oscillator, means for applying to said mixer for heterodyning the outputs of said source and of said local oscillator, an intermediate frequency amplifier for amplifying a heterodyne product of the output of said mixer, said intermediate frequency amplifier having a static resolution smaller than said wide band spectrum, a frequency modulator for modulating the frequency of said local oscillator to heterodyne successive increments of said spectrum into the pass band of said intermediate frequency amplifier in successive increments of time, a source of repetitive modulating potentials for said frequency modulator, means for controlling the static resolution of said amplifier in response to control potentials, and means for developing control potentials proportional to $\sqrt{wf}$ for controlling said static resolution, where $w$ equals the total frequency excursion of said local oscillator, and where $f$ equals the repetition rate of said source of repetitive modulating potential, in repetitions per second.

10. The combination in accordance with claim 9, wherein said means for developing control potentials comprises means for rectifying said modulating potentials.

11. In combination, a superheterodyne receiver comprising a local oscillator and an intermediate frequency amplifier having a predetermined selectivity characteristic, means for periodically varying the frequency of said local oscillator, and means for varying the selectivity of said intermediate frequency amplifier in accordance with a square root function of substantially the rate of periodic variation of frequency of said local oscillator.

12. The combination in accordance with claim 11 wherein said means for varying the frequency of said local oscillator comprises a reactance tube modulator and a source of modulating potential, and wherein said means for varying the selectivity of said intermediate frequency amplifier is responsive to a control signal and comprises means for deriving said control signal from said source of modulating potential.

13. In combination with a wide band superheterodyne receiver having a local oscillator and a narrow band intermediate frequency amplifier, means for varying the frequency of said local oscillator, and means for varying the selectivity of said intermediate frequency amplifier in proportion to the square root of the rate of variation of frequency of said local oscillator.

14. The system of securing an improved resolution in spectrum analysis, comprising:
(1) Means for receiving a band of the spectrum having a width of P cycles, P being variable,
(2) Means for periodically displacing this band at a repetition rate of $f$ repetitions per second over a band wider than P and having a width of $w$ cycles, wherein the value of P is made greater than $\sqrt{.2wf}$,
(3) Means for converting all signals received over the said band of $w$ cycles into visual signs and spacing the said signs in accordance with the difference of frequency between corresponding signals,
(4) Means for varying the numerical value of the function $\sqrt{wf}$,
(5) Means for generating a control voltage corresponding with numerical values of $\sqrt{wf}$, and
(6) Means for automatically varying the value of P in response to said control voltage and thus in dependence upon the value of the function $\sqrt{wf}$ to maintain P at a value greater than $\sqrt{.2wf}$.

15. A spectrum analyzer comprising frequency scanning means, said means scanning a band of the spectrum having a width of $w$ cycles and a rate of scan of $$\frac{dF}{dt}$$

cycles per second, where $$\frac{dF}{dt}$$

is variable, frequency selective means following the said scanning means and having a static resolution of P cycles, P being variable, means for maintaining the value of P greater than $$\sqrt{.2\frac{dF}{dt}}$$

for all values of $$\frac{dF}{dt}$$

16. The system of securing an improved resolution in spectrum analysis, comprising:
(1) Means for receiving a band of the spectrum having a width of P cycles, P being variable,
(2) Means for periodically displacing this band at a rate $$\frac{dF}{dt}$$

in cycles per second,
(3) Means for converting all signals received in the said band into visual signs,
(4) Means for varying the value of $$\frac{dF}{dt}$$

and
(5) Means for automatically varying the value of P substantially in dependence upon the value of $$\sqrt{\frac{dF}{dt}}$$

for all values of $$\frac{dF}{dt}$$

MARCEL WALLACE.

REFERENCES CITED

The following references are of record in the file of this patent:

UNITED STATES PATENTS

| Number | Name | Date |
| --- | --- | --- |
| 2,304,871 | Andrews | Dec. 15, 1942 |
| 2,371,397 | Koch | Mar. 13, 1945 |
| 2,381,940 | Wallace et al. | Aug. 14, 1945 |
| 2,412,991 | Labin | Dec. 24, 1946 |
| 2,435,960 | Flyer | Feb. 17, 1948 |

OTHER REFERENCES

Moulic: "Panoramic Receiver," Electronic Industries, July, 1944, pages 86, 87, 88, and 106.